United States Patent [19]

Smith et al.

[11] 3,867,234

[45] Feb. 18, 1975

[54] SPRAY DRYER CHAMBER COLLECTION SYSTEM EMBODYING A FLUIDIZED BED

[75] Inventors: Dexter A. Smith, Pittstown, N.J.; Richard Lang, Kent, England

[73] Assignee: Bowen Engineering, Inc., North Branch, N.J.

[22] Filed: Dec. 27, 1972

[21] Appl. No.: 318,779

[52] U.S. Cl. ............... 159/4 D, 159/45, 159/DIG. 3
[51] Int. Cl. ............................................. B01d 1/16
[58] Field of Search ............ 159/4 D, 4 S, 4 R, 4 A, 159/48 R, 4 C, DIG. 3; 34/10, 57 A

[56] References Cited
UNITED STATES PATENTS

| | | | |
|---|---|---|---|
| 1,210,097 | 12/1916 | Perry et al. | 159/4 S |
| 1,989,406 | 1/1935 | Doolittle | 159/4 D |
| 2,199,015 | 4/1940 | Toensfeldt | 34/34 |
| 2,357,648 | 9/1944 | Hall | 159/4 S |
| 2,561,393 | 7/1951 | Marshall | 159/4 C |
| 2,561,394 | 7/1951 | Marshall | 159/4 C |
| 2,992,141 | 7/1961 | Peebles | 159/4 D |
| 3,793,740 | 2/1974 | Ganiaris | 159/DIG. 3 |

FOREIGN PATENTS OR APPLICATIONS

| | | | |
|---|---|---|---|
| 1,014,936 | 8/1957 | Germany | 159/4 D |

Primary Examiner—Jack Sofer
Attorney, Agent, or Firm—Sperry and Zoda

[57] ABSTRACT

A spray drying system, of the type in which a liquid feed is converted into a dry powder by atomization in a stream of hot air, has a vertically disposed, upwardly opening outlet conduit within the collection area of the drying chamber. The conduit is aligned axially with the drying chamber to incorporate a fully symmetrical relationship between the chamber per se and the means for disengaging the dried product from the gaseous drying media.

The vertically disposed outlet conduit for the drying media cooperates with the wall of the chamber to define an annular area into which the disengaged particulates flow. Within this area is a fluidized bed in the form of a double helix pitched to an extent such as to assure free flow to a product outlet located at the lowest point of the helix.

A plenum below the bed permits introduction of a supplementary air flow. The bed is pervious to the flow of air, which is thus caused to pass upwardly thorough the bed to fluidize the dried product as an aid to its flow along the bed to the product outlet.

15 Claims, 6 Drawing Figures

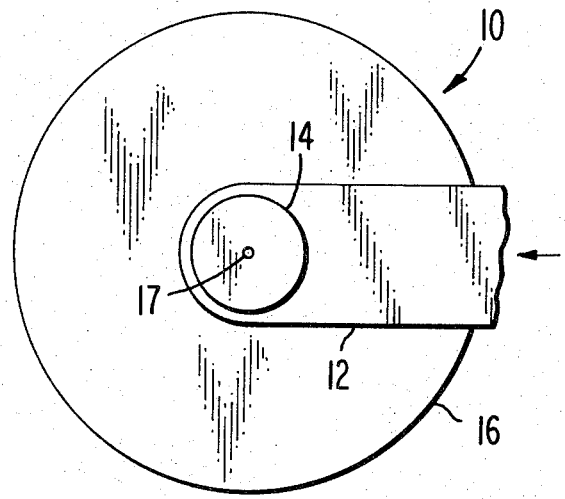
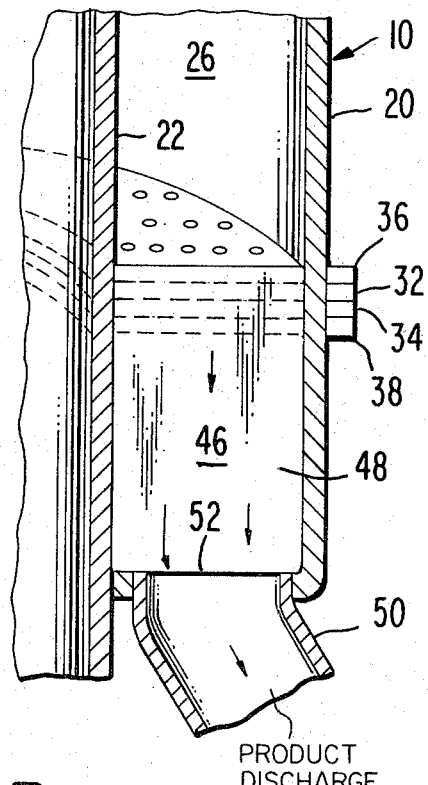
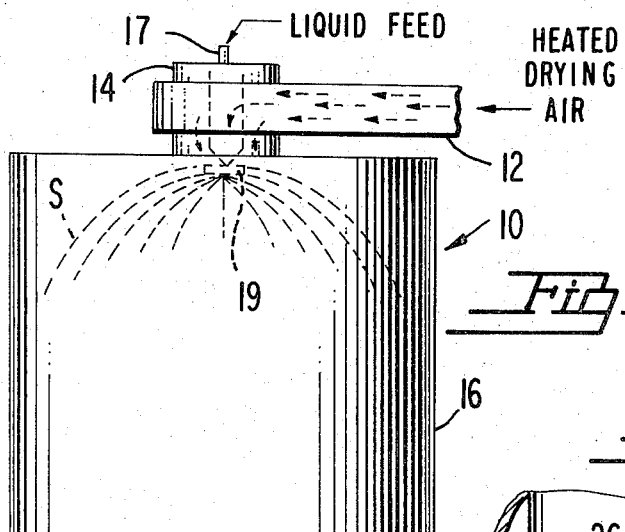
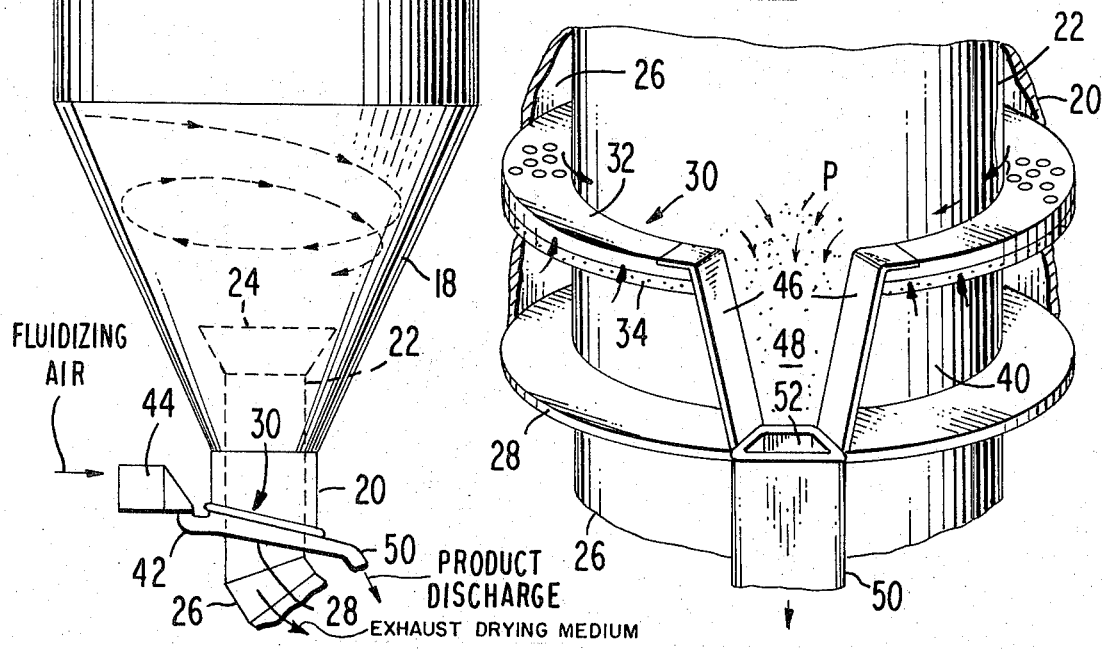

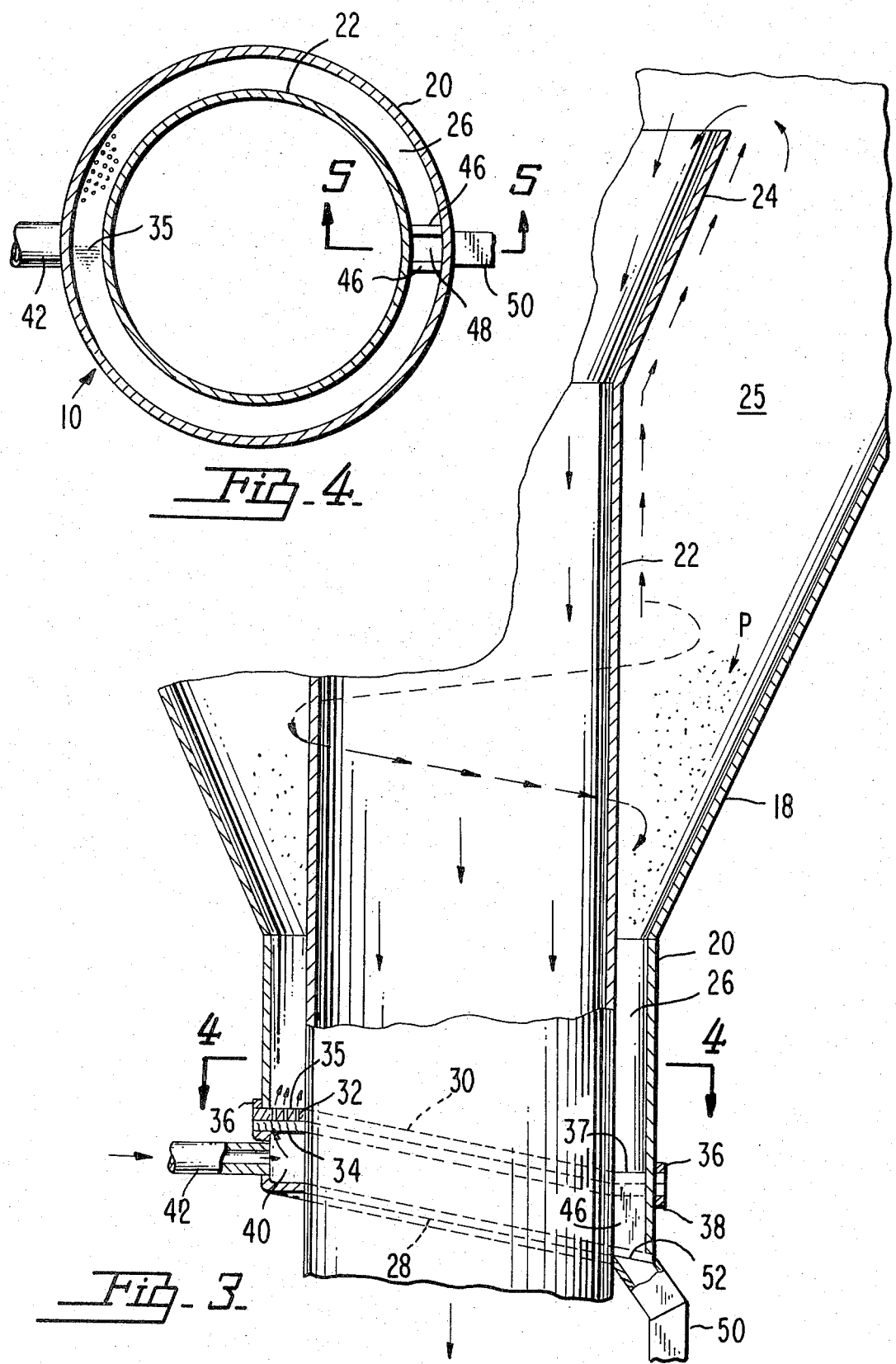

SPRAY DRYER CHAMBER COLLECTION SYSTEM EMBODYING A FLUIDIZED BED

BACKGROUND OF THE INVENTION

1. Field of the Invention

The invention relates generally to spray drying systems, including but not limited to systems of the conical-centrifugal type. Such systems are employed for converting, almost instantaneously, materials suspended in a liquid, into a dry powdered or granular product, in the presence of heated, gaseous drying media, normally air filtered and warmed to a predetermined temperature. Within the drying chamber, atomization of the liquid feed occurs. As a result of the almost instantaneous evaporation of the moisture, the materials fed into the chamber in the liquid carrier are dried while airborne.

Such systems are employed for producing dried, powdered or granular products in a wide range of commercial applications, including foods, chemicals, pharmaceuticals, ceramics, and the like.

The invention thus is found in the field of drying, in general; and in particular, in those areas concerned, within this art, with conversion of a liquid feed into dried, fluent solids within a stationary chamber in which the conversion occurs by exposing the atomized feed to a cyclonic air flow, and is thereafter separated from the drying media for discharge.

2. Description of the Prior Art

Heretofore, the conventional practice has been to remove the drying media through the provision of laterally extended exhaust ducts, having the disadvantage that when extended into the collection area of the chamber as has been customary, said ducts tend to impede a true cyclonic air flow. Thus, in the prior art a true symmetry has been lacking, as regards the relationship between the collection assembly of the chamber and the means for exhausting the drying media therefrom. As a result, the separating efficiency of the apparatus has been impaired. The industry is concerned with achieving an ever higher ratio between the products collected through the product removal outlet, and the products that remain entrained in the drying media as it passes through the exhaust duct provided therefor. A perfect separation, of course, would mean that 100 percent of the dried product would be removed through the product outlet, with none of the product solids being carried out with the exhausted, gaseous drying media. In practice, however, it would be considered that highly efficient results would be attained if, for example, the separation should be on the order of 90 percent of the dried product passing through the product outlet, to 10 percent passing out with the drying media.

Even this ratio is exceedingly difficult to attain, however, when the teaching of the prior art is employed.

It is also true that in the prior art structures, the interior arrangement of the component portions thereof have tended to cause an accumulation of the product on the surfaces of the outlet air duct and of the drying chamber, due to the projection of portions of the ducts in a manner tending to disrupt the cyclonic air currents to an extent such as produces eddy currents, undesired turbulence, and the like.

SUMMARY OF THE INVENTION

Summarized briefly, the present invention incorporates a spray drying apparatus which, like conventional driers heretofore known, incorporates a drying chamber the upper portion of which is of cylindrical form and constant diameter, said upper portion merging into a lower or outlet portion of inverted conical or frusto-conical configuration.

As is true also of the prior art, the product, carried in a stream of liquid, is introduced into the upper, inlet end of the chamber, and is there subjected to atomization. Heated drying air is blown into the upper end of the chamber, converting the liquid feed into a dried powdered or granular product.

Further in common with the prior art, the drying chamber according to the present invention is designed to develop a cyclonic movement to the drying air, in the lower, conical portion, whereby a separation of the dried product from the drying media - in this case, heated air - is effected.

The invention departs from the prior art by providing an exhaust means for the drying media, in the form of a vertically disposed, upwardly opening, outlet air duct, in symmetrical relationship to the drying chamber and in particular to the conical portion thereof, and fully concentric therewith. The arrangement produces a special cooperation between the conical chamber and the drying media exhaust assembly, such as to effect an improved separation of the dried product from said media, thereby to increase the hereinbefore-discussed ratio.

Further in accordance with the invention, an annular disengaging chamber is defined between the wall of the drying chamber and the drying media exhaust duct, into which the disengaged, dried product flows. Within this disengaging chamber, the invention incorporates a fluidizing, gas-pervious bed in the form of a double helix, whereby all portions of the bed decline over the full circumference of the disengaging chamber, to a product removal outlet. Below the bed is provided a correspondingly sloped plenum of constant depth throughout the chamber circumference, into which air is introduced as a fluidizing medium, to pass upwardly through the air-pervious bed and thereby enhance the fluency of the product as it gravitates toward the product outlet.

BRIEF DESCRIPTION OF THE DRAWING

FIG. 1 is a top plan view of the spray drier in which the air inlet duct is illustrated fragmentarily;

FIG. 2 is a side elevational view of the drier, the air inlet duct, air exhaust duct, and product outlet duct being shown fragmentarily;

FIG. 3 is an enlarged, fragmentary vertical sectional view, portions remaining in elevation, of the lower or outlet portion of the drier chamber, showing the improved collection, exhaust, and fluidized bed means embodied in the invention;

FIG. 4 is a horizontal sectional view, on the same scale as FIG. 3, through the lower end portion of the chamber on line 4—4 of FIG. 3;

FIG. 5 is a still further enlarged, detail, vertical sectional view on the same cutting plane as FIG. 3, taken substantially on line 5—5 of FIG. 4, showing the product removal outlet means; and FIG. 6 is a fragmentary perspective view of the lower portion of the apparatus, in which the wall of the lower end of the drying chamber has been broken away to expose the inclined, fluidized bed and its associated plenum and product outlet.

DESCRIPTION OF THE PREFERRED EMBODIMENT

Designated generally at 10 is a spray drier according to the present invention. A drier of this type, typically, might be perhaps 40' in height, overall, and 20', more or less, in diameter at the point of its greatest transverse dimension. As a result, and considering the capacity of such a structure in terms of tonnage, the structure would obviously incorporate an exterior-framing and support structure. None of this framing or supporting structure is illustrated, since the nature thereof is well known to the prior art, and illustration thereof would unnecessarily complicate the disclosure.

It is sufficient, for the purposes of the present invention, to note that in the illustrated embodiment, a laterally extending air inlet duct is provided, through which heated drying air is blown, into an inlet head 14, for passage into the drying chamber 16. Also extending into the head 14 is a conduit 17 for the liquid feed, carrying the solids to be dried in a stream of liquid.

Within chamber 16, as is well known in the art, the liquid feed is atomized, at the base of head 14, typically (other known atomization means could be used to equal advantage) by an atomizer wheel 19. At the same time, the atomized spray S is exposed to the heated drying air, as it flies from the wheel 19 by centrifugal force. Almost instantaneous drying of the solids occurs, and they pass into the lower outlet portion 18 of the drying chamber. This, as shown in FIG. 2, is of inverted frustoconical shape, merging at its lower end into a depending, cylindrical, constant diameter extension 20 of the drying chamber.

Within the tapered lower portion 18 of the chamber a cyclonic air current develops, as shown by the dotted directional arrows in FIG. 2. This facilitates the separation of the dried product solids from the gaseous drying media, as a result of which the solids are permitted to flow into the extension 20 for passage through a product outlet.

The description so far is common to that of conventional spray driers as heretofore constructed and operated.

Referring now to FIG. 3, and also to FIG. 2, in accordance with the invention there is provided a vertically disposed exhaust duct for the gaseous drying media, which as noted above in this case comprises heated air. This duct has been designated at 22, and extends upwardly, in coaxial alignment with the conical portion 18 of the drying chamber. As seen from the drawing, duct 22 projects upwardly within the small diameter, lower end of the conical or tapered chamber portion 18, and opens into free communication with said chamber portion a substantial distance above the lower extremity thereof. At its upper end, exhaust duct 22 is formed with a flared mouth or inlet end 24, to facilitate collection of the gaseous drying media and exhaustion thereof through duct 22.

Duct 22 thus cooperates with the lower portion 18 of drying chamber in defining an annular product collection chamber 25 decreasing progressively in area toward the lower, outlet end thereof. Within collection chamber 25, the dried product P passes, carried by the cyclonic air current developed in the tapered lowered end portion 18 of the drier chamber, the product thereafter passing into an annular disengaging chamber 26 defined between the wall of the extension 20 and the exhaust duct 22. Within chamber 26, the product flows unimpeded to a sloped fluidizing bed generally designated 30, inclined from the horizontal to an extent sufficient, as will be discussed in greater detail hereinafter, to assure free flow of the dried product P to a product outlet located at the low point of the bed. Bed 30 is spaced upwardly from, and is in parallel relation to, a correspondingly inclined bottom end wall 28 of drying chamber extension 20.

The particular materials from which bed 30 is formed may differ. For the purposes of the present invention it is mainly important to note, first of all, that bed 30 must be pervious to the passage of a gaseous fluidizing medium therethrough, while at the same time being designed to minimize blinding of the gas-pervious pores thereof by the dried product flowing upon said bed to the product outlet.

In the presently preferred embodiment, it has been found that a laminated bed 30 may be used to advantage. As a material found entirely suitable for the upper lamination 32, a sintered metal may be employed, as for example an expanded stainless steel material sold under the trademark "POR-O-SEPTA," a product of Multi-Metal Wire Cloth, Inc., 501 Route 303, Tappan, N.Y., 10983.

The lower lamination 34, in the illustrated example, is felt, having a porosity sufficient to permit the passage of air upwardly therethrough, said air passing upwardly, also, through the porous upper lamination 32.

The mounting of the laminated bed 30 may be disposed wholly interiorly of the drying chamber. Alternatively, and as shown, the outer edges of laminations 32, 34 can project through the chamber extension 20, and the projecting outer edge portions can be confined between retaining rings 36, 38 of metal material, which are secured to the wall of chamber extension 20 above and below the bed 40, and which can be aided in the retention of the laminations through the use of C clamps or the like, not shown, should this be necessary.

For the purposes of the present invention, it is mainly important to note that the bed 30 is in effect a double helix, that is, the bed has a high point 35 (FIG. 3), from which the bed slopes downwardly in both directions to the low point 37 disposed diametrically opposite the high point thereof. Thus, bed 30 is sloped, over the full distance from its high point 35 to the low point 37 thereof, in a downward direction, so that the dry product P passing downwardly into the disengaging chamber 26, will flow in both directions from the high point 35 to the low point around the air exhaust duct 22, to a product discharge outlet.

To fluidize the dry product P, air is introduced into a plenum 40 defined between bed 30 and lower end wall 28. In view of the parallel relation between the bed and the lower end wall, plenum 40 is inclined correspondingly to the bed, and furthermore is of constant depth or stated otherwise, of constant cross-sectional area through the full length of the plenum as it extends about air exhaust duct 22.

Air is introduced into the plenum through a fluidizing intake duct 42, which extends into the plenum from an air inlet 44 incorporating an air filter. The air filter, being completely conventional, is not illustrated per se. In any event, it may be further observed at this point that in addition to being filtered prior to introduction into the plenum, the air may be otherwise conditioned, that is, it may be heated, cooled, dehumidified, or otherwise treated according to the requirements of the particular situation.

In any event, air entering the plenum passes upwardly through the porous laminations 32, 34, and fluidizes the product P flowing along bed 30, so that said product, from high point 35, flows in both directions along the double helical path defined by the bed, to outlet 48 (see FIGS. 5 and 6), defined between downwardly converging end plates 46 of the bed. End plates 46, as seen from FIG. 6, are spaced apart at their upper ends, converging downwardly to define the product outlet 38 of the disengaging chamber 26, and at the same time, the plates 46 cooperate to close off direct communication between plenum 40 and said chamber 26, except of course through the pores of the bed 30. As seen from FIG. 6, air passing upwardly through said pores, fluidizes the product P, so that the product flows off the low end of the bed from both directions, into outlet 48, thereafter passing into a product discharge conduit 50 having an inlet end 52.

Meanwhile, the cyclonic air current within the drying chamber, following separation of the product P therefrom in the collection chamber 25, passes upwardly along the outside of the exhaust duct 22, to flow into the inlet end or mouth 24 thereof, thereafter to be discharged through the air exhaust duct extension 26 that projects through lower end wall 28 as shown in FIGS. 2 and 6.

In practice, the arrangement has been found to produce a particularly high degree of efficiency, as regards separation of the dried product from the gaseous drying medium, on the order of ninety percent of the product passing through the discharge conduit 50, to ten per cent of the product passing through the air exhaust duct 22. At the same time, the invention reduces product build-up on the interior components of the drying chamber, to an extent markedly less than that encountered in typical installations wherein the air exhaust duct is a component extending laterally out of the lower end of the chamber, and in which there are other factors causing turbulence and disruption of the desired cyclonic air current.

It will be understood that removal of the dried product through the discharge duct 50 may be controlled in any manner known to the art, as for example through the provision of a rotary air lock, not shown.

It may also be noted that in an actual embodiment, it has not been found necessary to utilize blower means or the like, to cause the fluidizing medium to be introduced into the plenum 40 and thereafter be caused to pass upwardly through the pervious bed. Rather, it may be drawn into the plenum 40 by negative pressure therein, and indeed, in an actual installation does function in this way. However, the invention may be considered as embracing the use of a fan or blower, or similar device, to induce air into the plenum 40 and force the same upwardly through the porous bed, should this be desired or necessary.

We claim:

1. In a spray drier of the type that includes a drying chamber having a lower, inverted-frusto-conical product outlet portion, means for introducing dissolved or suspended solids into the chamber in a carrier liquid, means within the chamber for atomizing said liquid, and means for introducing a first gaseous drying medium into the upper part of the chamber for drying the atomized solids-containing liquid to provide dried solids, the improvement comprising:

a. exhaust means for said first gaseous medium extending axially of said product outlet portion, said exhaust means having its inlet intermediate the ends of the outlet portion;

b. a bedplate pervious to the passage of a second gaseous medium introduced for fluidizing said dried solids, said bedplate providing a declining path for flow of the dried solids therealong, said bedplate extending about said gaseous exhaust means at the lower end of the chamber and having along said path a low point, said bedplate having at said low point a product discharge outlet through which to discharge said dried solids from the chamber; and c. said perforate bedplate providing means including a plenum below the bedplate for directing said second gaseous medium through the bedplate into fluidizing relation to the dried solids in flow therealong toward said product discharge outlet.

2. The improved spray drier of claim 1, and said exhaust means comprising a duct concentric with said lower product outlet portion of the drying chamber to cooperate therewith in defining a collection space for dried solids, said space being progressively reduced in horizontal cross sectional area in a direction toward the lower end of the drying chamber.

3. The spray drier of claim 1, and said exhaust means comprising a vertically disposed duct, in concentric relation to and extending upwardly within said lower product outlet portion of the drying chamber, said duct being of constant diameter and cooperating with the lower portion of the drying chamber to define therebetween an annular collection space for dried solids, said space being progressively reduced in transverse area in a direction toward the smaller end of said lower portion of the drying chamber.

4. In a spray drier of the type that includes a drying chamber having a lower, inverted-frusto-conical product outlet portion, means for introducing dissolved or suspended solids into the chamber in a carrier liquid, means within the chamber for atomizing said liquid, and means for introducing a first gaseous drying medium into the chamber in the upper part thereof for drying the atomized solids-containing liquid, the improvement comrising:

a. exhaust means for said first gaseous medium extending axially of said product outlet portion and formed with a gas inlet intermediate the ends of said outlet portion; and b. a bedplate pervious to the passage of a second gaseous medium for fluidizing resulting dried solids, said bedplate providing a declining path for flow of the dried solids therealong, said perforate bedplate providing means including a plenum below the bedplate for directing said second gaseous medium through the bedplate into fluidizing relation to the dried solids in flow therealong toward a product discharge outlet, said bedplate extending about said exhaust means at the lower end of the chamber and having along said path a low point, said bedplate having at said low point said product discharge outlet through which to discharge said dried solids from the chamber, said exhaust means comprising a vertically disposed duct, in concentric relation to and extending upwardly within the lower portion of the drying chamber, said duct having an inlet end disposed intermediate the ends of the lower portion of the drying chamber, said duct being of constant diameter to cooperate with the lower portion of the drying chamber in defining an annular collection region for dried solids, progressively reduced in horizontal cross section area in a direction toward the smaller end of said lower portion of the drying chamber, said drying chamber having a cylindrical, constant diameter extension in communication with and extending downwardly from the lower end of said lower portion of the drying chamber, said duct being concentric with said extension to cooperate therewith in defining an annular disengaging chamber within which the dry solids may be separated from said first gaseous medium, said bedplate extending about the duct at the lower end of the disengaging chamber to receive the solids following disengagement thereof from the first gaseous drying medium.

5. The spray drier of claim 4, said bedplate taking the form of a double oppositely pitched helix along which said solids may flow from a high point upon said helix to said low point, in opposite directions about said duct.

6. The spray drier of claim 4, said bedplate taking the form of a double oppositely pitched helix along which said solids may flow from a high point upon said helix to said low point, in opposite directions about said duct, said extension containing a plenum of annular shape extending about said duct below the bedplate, said plenum having a second gas inlet means for introducing a second, fluidizing gaseous medium into said plenum, the bedplate being pervious to the passage of said fluidizing medium for flow of the fluidizing medium through the bedplate into said path, thereby to enhance the fluency of the solids gravitating along said path.

7. The improved spray drier of claim 6, in which the bedplate comprises superposed laminations the upper one of which is formed of a sintered metal and the lower of which is felt.

8. In a spray drier of the type that includes a drying chamber having a lower, inverted-frusto-conical product outlet portion, means for introducing dissolved or suspended solids into the chamber in a carrier liquid, means within the chamber for atomizing said liquid, and means for introducing a first gaseous drying medium into the upper part of the chamber for drying the atomized solids-containing liquid to provide dried solids, the improvement comprising:
a. an exhaust duct for the first gaseous drying medium extending vertically and axially within said lower product outlet portion and defining in cooperation therewith correspondingly vertically disposed, communicating, annular collecting and disengaging spaces for dried solids;
b. a discharge outlet for said solids at the lower end of said collecting space;
c. an annular bedplate pervious to the passage of a second gaseous medium introduced for the purpose of fluidizing said dried solids, said bedplate forming the bottom of said collecting space and defining a declining flow path along which said solids may flow to the discharge outlet; and
d. said perforate bedplate providing means including a plenum below the bedplate for directing said second gaseous medium through the bedplate into fluidizing relation to the dried solids in flow therealong toward said product discharge outlet.

9. The improved spray drier of claim 8, and means for fluidizing solids during their passage along said flow path toward the solids discharge outlet, including means for directing said second gaseous medium into the plenum and forcing the second medium through the bedplate.

10. The improved spray drier of claim 8, wherein said bedplate is in the form of an annular member extending about the duct, and sloping downwardly toward the solids discharge outlet for flow of the solids along said member to the outlet.

11. The improved spray drier of claim 8, wherein said bedplate is in the form of an annular member having a high point and sloping downwardly along oppositely pitched, spiral paths in opposite directions about said duct from said high point, said high point being diametrically opposite the solids discharge outlet whereby the bedplate slopes downwardly toward said solids discharge outlet along opposite sides of said duct.

12. The improved spray drier of claim 8, in which said duct, at its upper end, has an inlet for said first gaseous medium symmetrically, concentrically disposed in respect to said lower portion of the drying chamber, and said collection and disengaging spaces being disposed wholly below the inlet of the duct.

13. The improved spray drier of claim 12, in which said inlet end of the duct is flared to form a large diameter mouth into which the first gaseous drying medium may pass during exhaustion thereof from the drying chamber.

14. In a spray drier of the type that includes a drying chamber having a lower, inverted-frusto-conical product outlet portion, means for introducing dissolved or suspended solids into the chamber in a carrier liquid, means within the chamber for atomizing said liquid, and means for introducing a first gaseous drying medium into the upper part of the chamber for drying the atomized solids-containing liquid to provide dried solids, the improvement comprising:
a. a drying medium exhaust duct extending vertically and axially within said lower product outlet portion and defining in cooperation therewith a correspondingly vertically disposed annular solids-collecting and gas-disengaging space;
b. a solids discharge outlet for said solids at the lower end of said space;
c. an annular bedplate forming the bottom of said space and defining a declining flow path along which said solids may flow to the solids discharge outlet; and
d. a plenum underlying said bedplate over the full length of the bedplate, the bedplate being pervious to the passage of a gaseous medium, and means for introducing a second gaseous medium to the plenum, for flow upwardly through the bedplate into fluidizing relation to dried solids moving along said flow path toward the outlet.

15. An improved spray drier as in claim 14, wherein said bedplate is in the form of an annular member having a high point and sloping downwardly in opposite directions about said duct from said high point, said high point being diametrically opposite the outlet for the dried solids, whereby the bedplate slopes downwardly toward the outlet at opposite sides of the outlet, said plenum being annular and being sloped correspondingly to the bedplate, said solid discharge outlet including opposed walls channeling the discharge of the dried solids therethrough and closing communication between the plenum and said collecting and disengaging spaces.

* * * * *